United States Patent
Siegler

(10) Patent No.: US 10,963,923 B2
(45) Date of Patent: Mar. 30, 2021

(54) OPTIMIZATION OF ONLINE ADVERTISING BID REQUESTS AND DYNAMIC FLOOR PRICING

(71) Applicant: Cox Media Group Digital Development, Inc., Atlanta, GA (US)

(72) Inventor: Scott Siegler, San Francisco, CA (US)

(73) Assignee: Cox Media Group Digital Development, Inc., Atlanta, GA (US)

(*) Notice: Subject to any disclaimer, the term of this patent is extended or adjusted under 35 U.S.C. 154(b) by 1034 days.

(21) Appl. No.: 14/863,530

(22) Filed: Sep. 24, 2015

(65) Prior Publication Data
US 2017/0091829 A1    Mar. 30, 2017

(51) Int. Cl.
*G06Q 30/02* (2012.01)

(52) U.S. Cl.
CPC ..... *G06Q 30/0275* (2013.01); *G06Q 30/0269* (2013.01); *G06Q 30/0277* (2013.01)

(58) Field of Classification Search
CPC .......... G06Q 30/0275; G06Q 30/0269; G06Q 30/0277
USPC ................ 705/14.71, 14.73, 14.69, 14.4; 455/452.1; 725/10
See application file for complete search history.

(56) References Cited

U.S. PATENT DOCUMENTS

| | | | |
|---|---|---|---|
| 9,224,101 B1* | 12/2015 | Chandalia | G06Q 10/067 |
| 2009/0240577 A1* | 9/2009 | McAfee | G06Q 30/0241 |
| | | | 705/14.4 |
| 2010/0332331 A1* | 12/2010 | Etchegoyen | G06Q 30/02 |
| | | | 705/14.69 |
| 2013/0295948 A1* | 11/2013 | Ye | H04W 74/06 |
| | | | 455/452.1 |
| 2014/0129351 A1* | 5/2014 | Ringdahl | G06Q 30/0275 |
| | | | 705/14.71 |

(Continued)

FOREIGN PATENT DOCUMENTS

| WO | WO-2010088479 A2 * | 8/2010 | ......... G06Q 30/0275 |
|---|---|---|---|
| WO | WO-2015078260 A1 * | 6/2015 | ........... G06F 3/0484 |

OTHER PUBLICATIONS

Ying Zhang, Information Processing and Management, 2014 (Year: 2014).*

*Primary Examiner* — Tarek Elchanti
(74) *Attorney, Agent, or Firm* — Eversheds Sutherland (US) LLP

(57) ABSTRACT

Systems, methods, and computer-readable media are disclosed for optimization of online advertising bid requests and floor pricing. In one embodiment, a method may include receiving a first ad impression request for an ad slot on a publisher website or mobile application from an ad exchange server, extracting first publisher website information from the publisher website, and associating the first publisher website information with the first ad impression request. The method may include comparing the referral website URL to a set of one or more historical ad impression requests, identifying second publisher website information associated with a second ad impression request, the second publisher website information comprising ad slot dimension information, and associating the second publisher website information with the first ad impression request. The method may include generating a bid request associated with the first ad impression request, and sending the bid request to one or more ad servers.

23 Claims, 8 Drawing Sheets

(56) References Cited

U.S. PATENT DOCUMENTS

| | | | | |
|---|---|---|---|---|
| 2014/0223462 A1* | 8/2014 | Aimone | ............ | H04N 21/4788 |
| | | | | 725/10 |
| 2015/0339728 A1* | 11/2015 | Sura | .................. | G06Q 30/0272 |
| | | | | 705/14.73 |
| 2015/0356632 A1* | 12/2015 | Vempati | ............. | G06Q 30/0275 |
| | | | | 705/14.71 |

* cited by examiner

OPTIMIZATION OF ONLINE ADVERTISING BID REQUESTS AND DYNAMIC FLOOR PRICING

BACKGROUND

Advertisers may develop digital ad campaigns with advertisements that are to be delivered to target consumers. For example, a target consumer may be a visitor to a particular website or application. When the target consumer navigates to the website or application, the website or application may have an ad slot at which the advertiser's ad can be presented to the target consumer. In many instances, more than one advertiser may be interested in presenting an ad at the ad slot. To determine which ad to present to the user, servers associated with the website or application may auction off the ad slot to an advertiser. However, during or prior to the auction process, much of the metadata associated with the ad slot that is available for auction may be corrupted or lost. As a result, the advertiser may only see incomplete information for the ad slot when placing a bid on the ad slot. In addition, certain publisher websites may implement floor pricing for ad slots, such that an ad slot will not be sold to an advertiser below a certain price. In some instances, floor pricing may negatively impact sales of digital advertising.

Figure 1:
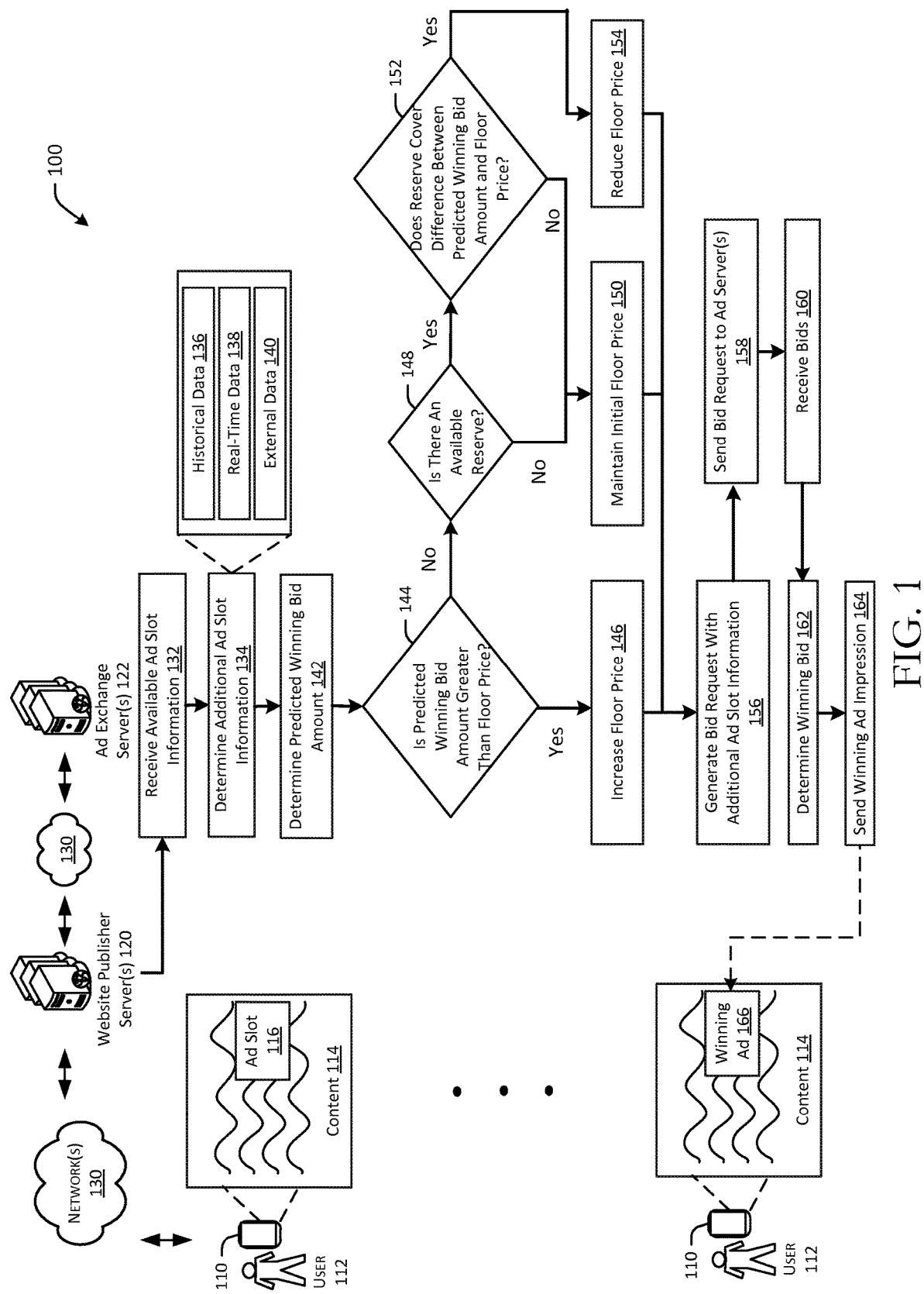
FIG. 1 schematically illustrates an example hybrid dataflow and process flow for optimization of online advertising bid requests and floor pricing in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for optimization of online advertising bid requests and floor pricing. Online advertising is unique, for example with respect to print advertising, due to the technological and computer- and internet-centric nature of the implementation. For example, online advertisements may be presented to specific individuals as determined in real-time. In another example, online advertisements are potentially unlimited as far as a volume of ad slots. Further, online advertisements may not have time constraints, unlike, for example, television advertisements that air at certain time slots. Moreover, online advertising can be uniquely targeted to the particular viewer such that no two people viewing the same website, for example, see the same advertisement. As a result, online advertising may implement unique bidding systems that require a technical implementation for a bidding system capable of running in real-time and contingent upon providing, in real-time, granular information for a particular ad slot. In addition, by providing more information, thereby increasing the granularity of the units, a filtering effect occurs, which enables an online advertising system to run with less memory and/or computing resources.

During an online advertising auction process, advertising slots (also referred to herein as "ad slot(s)") may be associated with metadata that provides additional information regarding the ad slot that is the subject of the auction, or that is available for presentation of a digital advertisement (also referred to herein as "digital ad(s)"). However, the auction process may involve multiple entities, such as a publisher website server, a third party server, an ad exchange server, an advertiser/buyer server, and/or other entities. In one example, a publisher website server may determine that an ad slot is available for sale, and may send information associated with the ad slot to the third party server as an advertisement impression request representing a request for an ad to fill the available ad slot. The third party server may forward the ad impression request to an ad exchange server that may conduct or facilitate the bidding portion of the auction process. For example, the ad exchange server may send bid requests with some or all of the information associated with the ad impression request to one or more ad servers. The ad servers may receive the bid request and related information, and may submit bids to the ad exchange server. The ad exchange server may determine a winning bidder and facilitate presentation of the winning advertisement at the available ad slot. However, as the information associated with the available ad slot and/or the ad impression request is communicated from one entity to another, some or all of the information may be corrupted or otherwise lost. For example, formatting differences, data protocols, browser technology, and other factors may impact the ability to retain information associated with an available ad slot and/or ad impression request. As a result, rather than determining that an available ad slot is on a business news page of wsj.com, an advertiser may only be able to determine that the available ad slot is at wsj.com.

Advertisers may desire to reach particular segments of consumers or target consumers, and advertisers may therefore desire as much information as possible regarding an available ad slot. Using the information, advertisers may determine an appropriate bid amount or may better target ad impressions. For example, if an advertiser knows that a demographic of a user to which an ad is to be presented matches the advertiser's target demographic, the advertiser may submit a relatively higher bid amount than if the advertiser was unable to determine a demographic of the user. Certain advertisers may only bid on ads that meet certain thresholds of information. As a result, such advertisers may miss out on ad slots that meet the advertiser's requirements, but for which information was simply missing, lost, or otherwise unavailable. Therefore, ads with missing, lost, or unavailable information may sell for less than their true values or their value with an increased amount of information. In contrast, other advertisers may bid less than the true value they place on their true target because they want to buy broadly to ensure that they capture some of their most targeted audience.

Certain embodiments of the disclosure may recover and/or generate additional information for certain available ad slots before bids are requested. As a result, advertisers may receive the additional information recovered and/or generated by embodiments of the disclosure, and may make appropriate bid amount determinations with information that may otherwise not have been available.

By generating information associated with particular available ad slots, embodiments of the disclosure may generate robust bid requests that may result in higher bid amounts, optimized auction processes, and may also reduce an amount of computing power needed to facilitate the auction process. For example, embodiments of the disclosure may enhance the information associated with an ad impression request to determine that a user that may consume the ad is a male. Upon receiving this information, advertisers of women's products may decide not to submit a bid at all or they may be filtered out, thereby reducing the total number of bid submissions in response to a bid request. Due to the lower number of total bid submissions, a reduced amount of computing power may be needed to process the bids and determine a winner. In contrast, if the user was not identified as male, additional advertisers may still have submitted bids, resulting in an increased amount of bid submissions that would have to be processed before determining a winner.

In addition, certain publisher websites may include floor pricing for some or all of the available ad slots on websites under the publisher's control. For example, a publisher may determine that an ad slot at a particular location on a certain website may not be sold for less than $1.00. As a result, an ad slot may remain unsold because a maximum bid was less than the floor price. However, in some instances, a maximum bid may be relatively close to the floor price, such as a bid of $0.95 where the floor price is $1.00. In such instances, the publisher may desire to sell the ad slot at the maximum bid price rather than leaving the ad slot unsold.

Embodiments of the disclosure may determine a predicted winning bid amount for an ad slot, and may adjust the floor price before bids are requested from advertisers. For example, if a publisher's floor price is $1.00, and embodiments of the disclosure determine a predicted winning bid amount of $2.00, embodiments of the disclosure may raise the floor price to, in one example, $1.90 after incorporating a safety factor or safety amount. As a result, if an advertiser bids $2.00, the winning bid in a second price auction, as described herein, may be at least $1.90, depending on whether other bids were received. Further, if the only bid received was $2.00, under the initial floor price of $1.00, the final sale price, or winning bid amount, would have been $1.00, whereas with the raised floor price of $1.90, the winning bid amount becomes $1.90, allowing the publisher to collect extra proceeds from the sale of the ad slot.

Embodiments of the disclosure may further reduce floor prices in certain instances. For example, if the predicted winning bid amount is lower than the initial floor price set by the publisher, embodiments of the disclosure may determine whether a reserve amount is available. Continuing the example above, by increasing the floor price to $1.90 and selling the ad slot at $1.90 instead of $1.00, a reserve amount of $0.90 may become available to embodiments of the disclosure. Reserve amounts may be a difference between adjusted floor prices and initial floor prices in some embodiments, or a difference between a final sale price for an ad slot with an adjusted sale price and an initial floor price in other embodiments. As a result, the publisher may be able to sell ad slots that may otherwise remain unsold because of the floor price.

Referring now to FIG. 1, in the context of online advertising, an advertisement impression may be delivered for presentation (e.g., rendering) to a user 112 in an ad slot 116 at a user device 110. The user 112 may be associated with user attributes, which may be provided by the respective user and/or determined via user interaction. User attributes may include demographic information, geographic information, electronic and/or physical addresses, and other information. Presentation of the advertisement in an ad slot 116 may be referred to as serving an advertisement impression. As used herein, the terms "advertising slot" or "available advertising slot" may refer generally to a location, environment, or placeholder in which, or in connection with which, an impression of an advertisement may be served. In a more specific context, these terms may refer to, for example, a particular location on a web page at which an impression of an advertisement may be presented to and potentially consumed by a user. Further, the terms "delivery of an advertisement," "delivery of an advertisement impression," "presentment of an advertisement impression," "serving an ad impression," or any other similar term may be used interchangeably throughout this disclosure. Although FIG. 1 includes the illustrated components, other embodiments may include additional or fewer components.

FIG. 1 illustrates an example use case 100 in accordance with one or more embodiments of the disclosure. Advertisers may develop ad campaigns with specific goals. To accomplish the goals of the ad campaign, an advertiser may desire to present ads to target consumers identified by various targeting criteria, such as age or age range, demographics, geographic location, gender, or other criteria. To serve ad impressions in an online context, ad campaigns or related parties may be subject to a bidding process for an available ad slot, in which the ad impression of the winning bidder will be served. Before an ad impression is served to a potential consumer, an entity, such as an ad exchange system, may send a bid request for an advertisement to display in connection with an available advertising slot.

In FIG. 1, one or more website publisher server(s) 120 may be in communication with the user device 110 via one or more network(s) 130, such as a wireless network. The website publisher server 120 may facilitate presentation of content 114 at the user device 110. The website publisher server 120 may generate digital content 114 for presentation to the user 112 on a display of the user device 110. The digital content 114 may include the available ad slot 116 indicating an ad slot in which an ad impression may be served to the user 112. The website publisher server 120 may be in communication with one or more ad exchange server(s) 122 via the one or more network(s) 130. In some embodiments, the website publisher server 120 and the ad exchange server 122 may be in communication via a different network. In some embodiments, a request may be received from a publisher or through an ad exchange. The website publisher server 120 may determine that the ad slot 116 is available and may generate an ad impression request. The ad impression request may include information associated with the ad slot 116, such as a page on which the ad impression is to be served, the content of that page 114, the referring URL, the category of the content or page, the publisher, user information for the user 112, the ad dimensions, and the like.

At block 132, the ad exchange server 122 may receive the ad impression request and the available ad slot information. However, the website publisher server 120 may indirectly communicate the ad impression request to the ad exchange server 122 through one or more intermediaries. As a result, the ad impression request may no longer include all of the initial information that may have been included or associated with the ad impression request (e.g., page on which the ad impression is to be served, the content of that page 114, the referring URL, the category of the content or page, the publisher, user information for the user 112, sentiment of the page, etc.). For example, the available ad slot information received by the ad exchange server 122 may include only a referring URL, or other information that may be less complete than the information originally provided by the website publisher server 120.

At block 134, the ad exchange server 122 may determine additional available ad slot information. For example, the ad exchange server 122 may analyze historical data 136, determine real-time data 138, and/or determine external data 140 to determine additional information that may be associated with the available ad slot. The ad exchange server 122 may analyze historical data by comparing the historical data to information associated with the ad impression request to determine whether previous ad impression requests were processed for the website publisher server 120, or for another related entity. The ad exchange server 122 may determine or identify a previous ad impression request that is related to the present ad impression request, and may associate information from the previous ad impression request with the present ad impression request. In one example, ad slot dimensions may have been associated with a previous ad impression request, and may be missing from the present ad impression. The ad exchange server 122 may determine, based at least in part on historical data, such as a previous ad impression request from the same referring URL, the ad slot dimensions. The ad exchange server 122 may associate the identified or determined ad slot dimensions with the present ad impression request, thereby creating more robust information associated with the present ad impression request. Other information that may be determined may including user-specific information (e.g., demographic, purchase history, search history, etc.), context information (e.g., time of day, seasonality, website content, keywords, etc.).

In another example, the ad exchange server 122 may optionally determine that a publisher identifier is missing from the present ad impression request. The ad exchange server 122 may determine real-time data 138 to determine the publisher identifier. In one embodiment, the ad exchange server 122 may request the publisher identifier from a JavaScript engine or other software operating locally at the user device 110, such as at a browser on the user device 110. The JavaScript engine may send the requested information, such as the publisher identifier, to the ad exchange server 122. The ad exchange server 122 may associate the received information with the ad impression request.

In another example, the ad exchange server 122 may optionally determine that a website category is missing from the present ad impression request. The ad exchange server 122 may determine external data 140 to determine the website category. In one embodiment, the ad exchange server 122 may request information from an external source or third party source, such as a mobile application store, online marketplace, third party database, or the like, to determine or request information such as star rating, user feedback or ratings, website categories, and other information. The ad exchange server 122 may receive the information and may associate the received information with the ad impression request.

At block 142, based at least in part on the ad impression request, and in some instances the additional data determined by the ad exchange server 122, the ad exchange server 122 may determine a predicted winning bid amount. For example, the ad exchange server 122 may analyze the ad impression request, the determined additional data, previous or historical auctions for similar or related ad slots, bidding trends from potential bidders, and the like to determine a predicted winning bid amount. In one example, the ad exchange server 122 may determine a set of one or more advertisers to which bid requests may be sent. The set of one or more advertisers may be based at least in part on a webpage category or other attribute of the available ad slot. Upon determining potential advertisers, the ad exchange server 122 may determine bidding histories or trends for bids submitted by respective advertisers, and may determine or calculate a predicted winning bid amount based at least in part on the historical behavior of the potential advertisers. In some embodiments, the ad exchange server 122 may determine average winning bid amounts across aggregate ad slots for a particular publisher or website in order to determine a predicted winning bid amount.

Advertisement metrics may also be considered in determining a predicted winning bid amount. Advertising metrics may include data relating to a number of ad impressions previously served, a time period over which the ad impressions were served, an associated click-through rate, a number of clicks generated, a number of page views of web sites of advertisers generated based on ad impressions, a number of searches conducted as a result of ad impressions, a number of purchases made of advertised products or services, a purchase rate, a consideration rate, and so forth.

At determination block 144, one or more modules of the ad exchange server 122 may be executed to determine whether the predicted winning bid amount is greater than a floor price associated with the ad impression request. For example, the ad exchange server 122 may identify or determine a floor price associated with the ad impression request. In some embodiments, the floor price for the ad slot may be received from the website publisher server 120, while in other embodiments, the floor price may be locally available or otherwise accessible to the ad exchange server 122. The ad exchange server 122 may compare the predicted winning bid amount to the floor price to determine whether the predicted winning bid amount is greater than the floor price.

If it is determined at block 144 that the predicted winning bid amount is greater than the floor price, the ad exchange server 122 may proceed to block 146, at which the floor price may be increased. In some embodiments, the floor price may be increased to an amount between the initial floor price and the predicted winning bid amount, while in other embodiments, the floor price may be increased to match the predicted winning bid amount. For example, the ad exchange server 122 may provide a safety cushion or safety factor that may be a fixed amount or a percentage of the difference between the predicted winning bid amount and the floor price so as to prevent losing a potential sale of the ad slot if the predicted winning bid is not accurate.

If it is determined at block 144 that the predicted winning bid amount is not greater than the floor price, the ad exchange server 122 may proceed to determination block 148. At determination block 148, one or more modules of the ad exchange server 122 may be executed to determine whether a reserve amount is available or whether the publisher has opted into sub-floor pricing. The reserve amount may be based at least in part on previous or historical auctions facilitated by the ad exchange server 122 for the website publisher server 120.

If it is determined at block 148 that there is no available reserve, the ad exchange server 122 may proceed to block 150, at which the initial floor price is maintained, or is not adjusted.

If it is determined at block 148 that there is an available reserve, the ad exchange server 122 may proceed to determination block 152. At determination block 152, one or more modules of the ad exchange server 122 may be executed to determine whether the reserve covers a difference between the predicted winning bid amount and the floor price. For example, if the predicted winning bid amount is $0.90, and the floor price is $1.00, the difference between the predicted winning bid amount and the floor price is $0.10. If the reserve amount is $0.50, the ad exchange server 122 may determine that the reserve amount covers (e.g., is equal to or greater than) the difference between the predicted winning bid amount and the floor price.

If it is determined at block 152 that the reserve does not cover the difference between the predicted winning bid amount and the floor price, the ad exchange server 122 may proceed to block 150, at which the initial floor price is maintained, or is not adjusted.

If it is determined at block 152 that the reserve price does cover the difference between the predicted winning bid amount and the floor price, the ad exchange server 122 may proceed to block 154, at which the floor price is reduced. In some embodiments the floor price may be reduced to equal the predicted winning bid amount, while in other embodiments, the floor price may be reduced to an amount in between the predicted winning bid amount and the floor price to provide a safety cushion.

Upon adjusting the floor price, if needed, the ad exchange server 122 may proceed to block 156, at which a bid request is generated with the additional ad slot information. The bid request may include the ad impression request information, as well as additional information determined by the ad exchange server 122, such as a user identifier or user information related to the user to which the ad impression will be served, website content or context, location information, time of day or chronological information, and other related information. In some embodiments, additional ad slot information may be associated with the bid request prior to determining an estimated bid price or predicted winning bid amount.

At block 158, the ad exchange server 122 may send the bid request to various entities for an advertisement to be displayed or otherwise presented or served in connection with the available ad slot 116. Various entities, such as ad servers or ad delivery servers, may be capable of communicating with the ad exchange server 122 to submit bids in response to the bid request for the opportunity to present an ad impression in connection with the available ad slot 116.

At block 160, the bidding entities or ad servers may receive the bid request from the ad exchange server 122. The bidding process may occur in real-time as bid requests for the available ad slot 116 are received. In one or more representative scenarios, the entire time from transmission of the bid request from the ad exchange server 122 to a bidding entity and receipt of a bid amount from the bidding entity by the ad exchange server 122 may span approximately 100 milliseconds. The bidding entities may include the advertisers themselves or third parties bidding on behalf of advertisers. In response to the bid request, bids may be submitted to the ad exchange server 122 by the various entities.

At block 162, the ad exchange server 122 may determine a winning bid. The bidder that submits the highest bid amount for the ad slot 116 may win the right to deliver an ad impression for the ad slot 116. The ad exchange server 122 may determine a winning bid by ranking the received bid amounts and determining a highest bidder. The ad exchange server 122 may optionally compare the advertiser that submitted the bid against a blacklist to determine whether the advertiser is prevented from advertising at the ad slot 116. For example, the publisher may desire to prevent competitors from presenting ads on the publisher's webpage. The ad exchange server 122 may optionally compare the advertiser that submitted the bid to a whitelist or approved list to determine whether the advertiser is approved or preapproved to present an ad at the ad slot 116. The ad exchange server 122 may compare the winning bid amount to the floor price to determine whether the floor price has been met.

If the floor price has been met by the winning bid, the ad exchange server 122 may facilitate presentation of the ad impression associated with the winning bid at block 164. The advertisement associated with the winning bid may be sent from the ad exchange server 122 to the website publisher server 120 for presentation at the available ad slot 116. As shown in FIG. 1, a winning ad 166 may be served to the user 112 as part of the digital content 114.

Dynamically enhancing ad impression information to generate relatively more complete bid requests may result in increased bids or more targeted and more valuable ads, and may affect bidding activity for digital advertisement slots. Adjusting floor prices for specific ad slot auctions may also result in a reduced number of unsold ad slots and enhanced revenue realization. Embodiments of the disclosure may therefore generate optimized auctions for digital ads and may reduce an amount of computing power needed to facilitate digital ad auctions.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
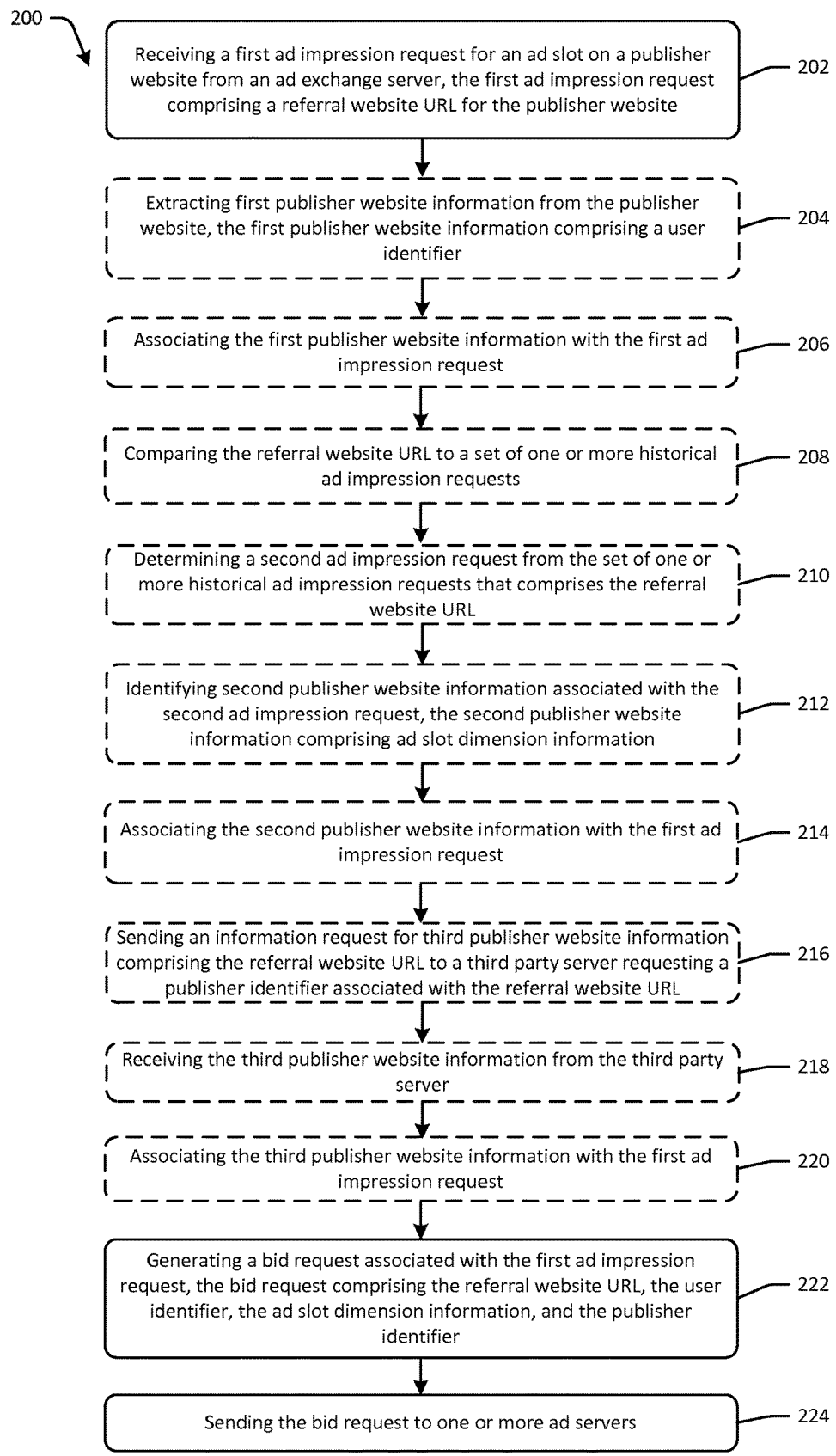
FIG. 2 schematically illustrates an example process flow in accordance with one or more embodiments of the disclosure.
Figure 3:
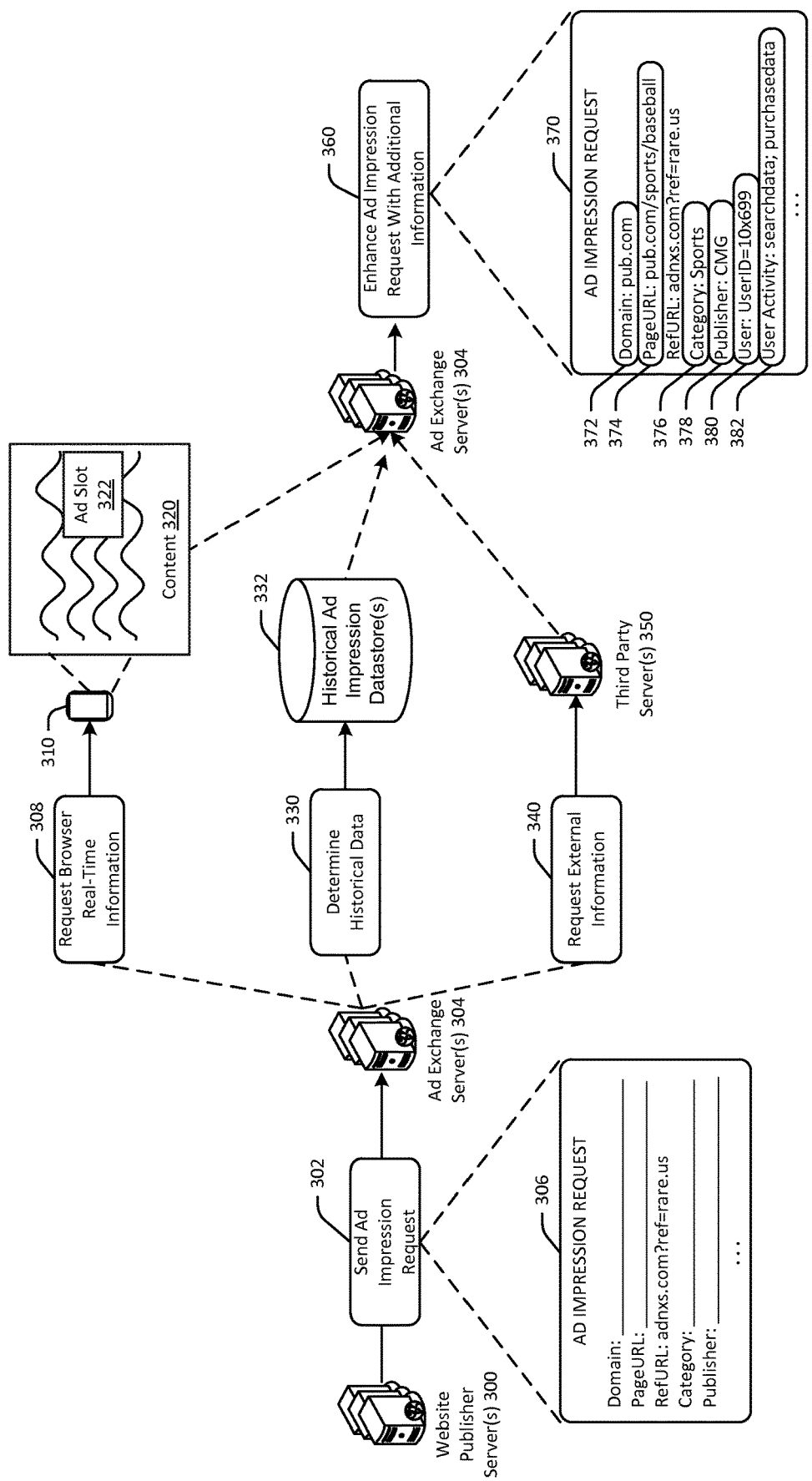
FIG. 3 schematically illustrates an example hybrid dataflow and process flow in accordance with one or more embodiments of the disclosure.

Referring to FIGS. 2-3, FIG. 2 illustrates an example process flow 200 for optimizing online advertising bid requests in accordance with one or more embodiments of the disclosure and will be discussed in conjunction with the hybrid dataflow and process flow depicted in FIG. 3. Although certain operations are illustrated as occurring separately in FIGS. 2 and 3 for clarity, some or all of the operations may occur concurrently or partially concurrently. Other embodiments may include additional or fewer, or different, components than those illustrated in FIG. 3.

Referring first to FIG. 2, at block 202 of the process flow 200, an ad exchange server may receive a first ad impression request for an ad slot on a publisher website. The first ad impression request may include ad slot information, such as a referral website URL associated with the publisher website. In some embodiments, the first ad impression request may include additional information, such as a publisher identifier, website context information, user information, user device information, and/or mobile application information.

Referring to FIG. 3, an example use case implementing the process flow 200 is partially illustrated. In the example of FIG. 3, one or more website publisher server(s) 300 may send an ad impression request 302 to one or more ad exchange server(s) 304. The website publisher server 300 may be in communication with a user device and may serve digital content for presentation on a display of the user device. The website publisher server 300 may receive a request for content from the user device and may determine that an ad slot is available for presentation of an ad impression to the user viewing digital content on the user device. The ad exchange server 304 may receive the ad impression request from the website publisher server 300. An ad impression request 306, as shown in FIG. 3, may include ad slot information associated with an available ad slot. For example, the ad impression request 306 may include a domain, a page URL, a referring URL, a category, a publisher, and other information. However, some or all of the information may be missing from the ad impression request 306.

In some embodiments, upon receiving the ad impression request 306, the ad exchange server 304 may optionally determine that the first ad impression request is missing certain information, such as a user identifier or ad slot dimension information.

At block 204 of the process flow 200 in FIG. 2, computer-executable instructions of one or more module(s) stored on a memory of an ad exchange server may be optionally executed to extract first publisher website information from the publisher website, the first publisher website information comprising a user identifier.

In FIG. 3, the ad exchange server 304 may request real-time browser information 308 to supplement the ad slot information associated with the ad impression request 306. For example, the ad exchange server 304 may communicate with a user device 310 to identify attributes associated with the user, the user device, or the available ad slot. In one example, the user device 310 may send a request to a browser operating on the user device 310, which may be to a JavaScript engine, to extract certain information from the browser and/or user device 310. The extracted information may then be sent to the ad exchange server 304. The JavaScript engine may be configured to determine or identify real-time information and to send the determined information to the ad exchange server 304. For example, the ad exchange server 304 may request information related to the presented webpage content 320, the available ad slot 322, such as ad slot dimension information, publisher identifiers, user identifiers, or other information. The JavaScript engine may determine the requested information and send the requested information to the ad exchange server 304.

At block 206 of the process flow 200, computer-executable instructions of one or more module(s) stored on a memory of an ad exchange server may be optionally executed to associate the first publisher website information with the first ad impression request. In FIG. 3, the ad exchange server 304 may associate the extracted information with the ad impression request 306.

At block 208 of the process flow 200, computer-executable instructions of one or more module(s) stored on a memory of an ad exchange server may be optionally executed to compare the referral website URL to a set of one or more historical ad impression requests.

In FIG. 3, the ad exchange server 304 may determine historical data 330 to supplement the ad slot information associated with the ad impression request 306. For example, the ad exchange server 304 may optionally extract the "refURL" or referring URL information from the ad impression request 306, and may compare the extracted information to cached or stored historical data to determine whether there is a match. While referring URLs are discussed in this example, the ad exchange server 304 may extract any available information to determine whether historical data is available. In some embodiments, the cached or stored historical data may be locally stored, while in other embodiments, the historical data may be stored remotely. In such instances, the ad exchange server 304 may extract certain available information from the ad impression request 306 to generate extracted information, and may send the extracted information to a remote server database, such as the illustrated historical ad impression database(s) 332 for analysis. The ad exchange server 304 may receive a set of one or more historical ad impression requests that match some or all of the extracted information. In other embodiments, the ad exchange server 304 may determine a set of one or more historical ad impression requests that match some or all of the attributes associated with the ad impression request 306. Historical ad impression requests may include extracted data such as, but not limited to, ad slot dimensions, page sentiment identifiers or page sentiment categories, a publisher identifier, a page or subpage identifier, and the like.

At block 210 of the process flow 200 in FIG. 2, computer-executable instructions of one or more module(s) stored on a memory of an ad exchange server may be optionally executed to determine a second ad impression request (which may be in the form of a data lookup) from the set of one or more historical ad impression requests that comprises the referral website URL. For example, in FIG. 3, the ad exchange server 304 may determine or identify a previous or historical ad impression request from the historical ad impression datastore(s) 332 that matches or substantially matches the ad impression request 306. For example, the historical ad impression may have been from the same referring URL, or from the same publisher, or for the same user, etc.

At block 212 of the process flow 200, computer-executable instructions of one or more module(s) stored on a memory of an ad exchange server may be optionally executed to identify second publisher website information associated with the second ad impression request, the second publisher website information comprising ad slot dimension information. In FIG. 3, the ad exchange server 304 may determine that the historical ad impression was associated with ad slot dimensions, and may determine that it is unlikely the ad slot dimensions changed over time.

At block 214 of the process flow 200 in FIG. 2, computer-executable instructions of one or more module(s) stored on a memory of an ad exchange server may be optionally executed to associate the second publisher website information with the first ad impression request. In FIG. 3, the ad exchange server 304 may associate the ad slot dimensions of the historical ad impression request with the present ad impression request 306.

At block 216 of the process flow 200 in FIG. 2, computer-executable instructions of one or more module(s) stored on a memory of an ad exchange server may be optionally executed to send an information request comprising the referral website URL to a third party server, the information request indicative of a request for a publisher identifier associated with the referral website URL.

In FIG. 3, the ad exchange server 304 may request external information 340 to supplement the ad slot information associated with the ad impression request 306. For example, the ad server 304 may send a request to one or more third party server(s) 350 requesting certain information, such as publisher information, user ratings, star ratings, sentimental content ratings, website category information, operating system information, mobile app information (e.g., version, features, name, etc.), app store information, and other information. While illustrated in FIG. 3 as occurring upon request by the ad exchange server 304, external information may be periodically or continuously updated by the third party server 350, and may be provided or sent to the ad exchange server 304 upon demand.

At block 218 of the process flow 200, an ad exchange server may optionally receive the publisher identifier, and at block 220, computer-executable instructions of one or more module(s) stored on a memory of an ad exchange server may be optionally executed to associate the publisher identifier with the first ad impression request. In FIG. 3, the ad exchange server 304 may receive information from the third party server 350 and may associate the information with the ad impression request 306.

At block 222, computer-executable instructions of one or more module(s) stored on a memory of an ad exchange server may be executed to generate a bid request associated with the first ad impression request, the bid request comprising the referral website URL, the user identifier, and the ad slot dimension information.

In FIG. 3, the ad exchange server 304 may enhance the original ad impression request with the additional information 360. As a result, the ad exchange server 304 may generate an ad impression request 370, which may be the same or different than a bid request, that includes the additional information. For example, the ad impression request 370 may include additional ad slot information such as a domain 372, a page URL 374, a webpage category 376, a publisher identifier 378, a user identifier 380, and/or user activity information 382, such as search history information, purchase history information, intent information, or the like. Any of the additional information 372, 374, 376, 378, 380, 382 that was previously missing from the original ad impression request 306 may have been determined or identified by the ad exchange server 304 from the real-time browser information 308, the historical data 330, and/or the external information requests 340.

At block 224, computer-executable instructions of one or more module(s) stored on a memory of an ad exchange server may be executed to send the bid request to one or more ad servers. In FIG. 3, the ad exchange server 304 may send a bid request with the ad impression request 370 or the ad slot information to one or more ad servers to solicit bids for the available ad slot. The ad exchange server 304 may receive a bid from an ad server in response to the bid request. The bid may include a bid amount for the ad slot. The ad exchange server 304 may determine that the bid is a winning bid, and may send a winning notification to the ad server. The ad exchange server 304 may receive ad impression information including a digital advertisement, and may facilitate or send the ad impression information for presentation of the digital advertisement in the ad slot at the publisher website. The ad exchange server 304 may store the first ad impression request in the set of one or more historical ad impression requests for later reference in determining missing ad slot information.

Figure 4:
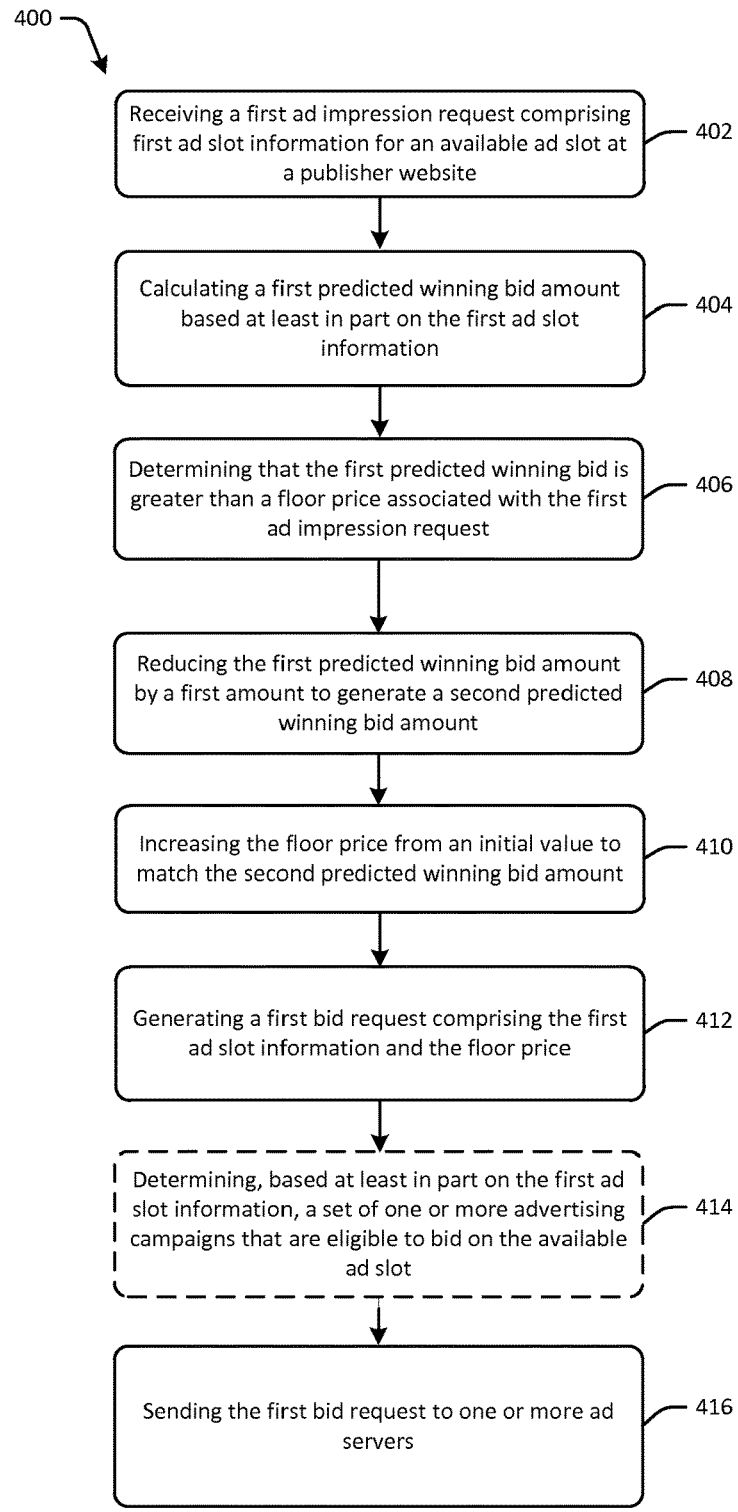
FIG. 4 schematically illustrates an example process flow in accordance with one or more embodiments of the disclosure.
Figure 5:
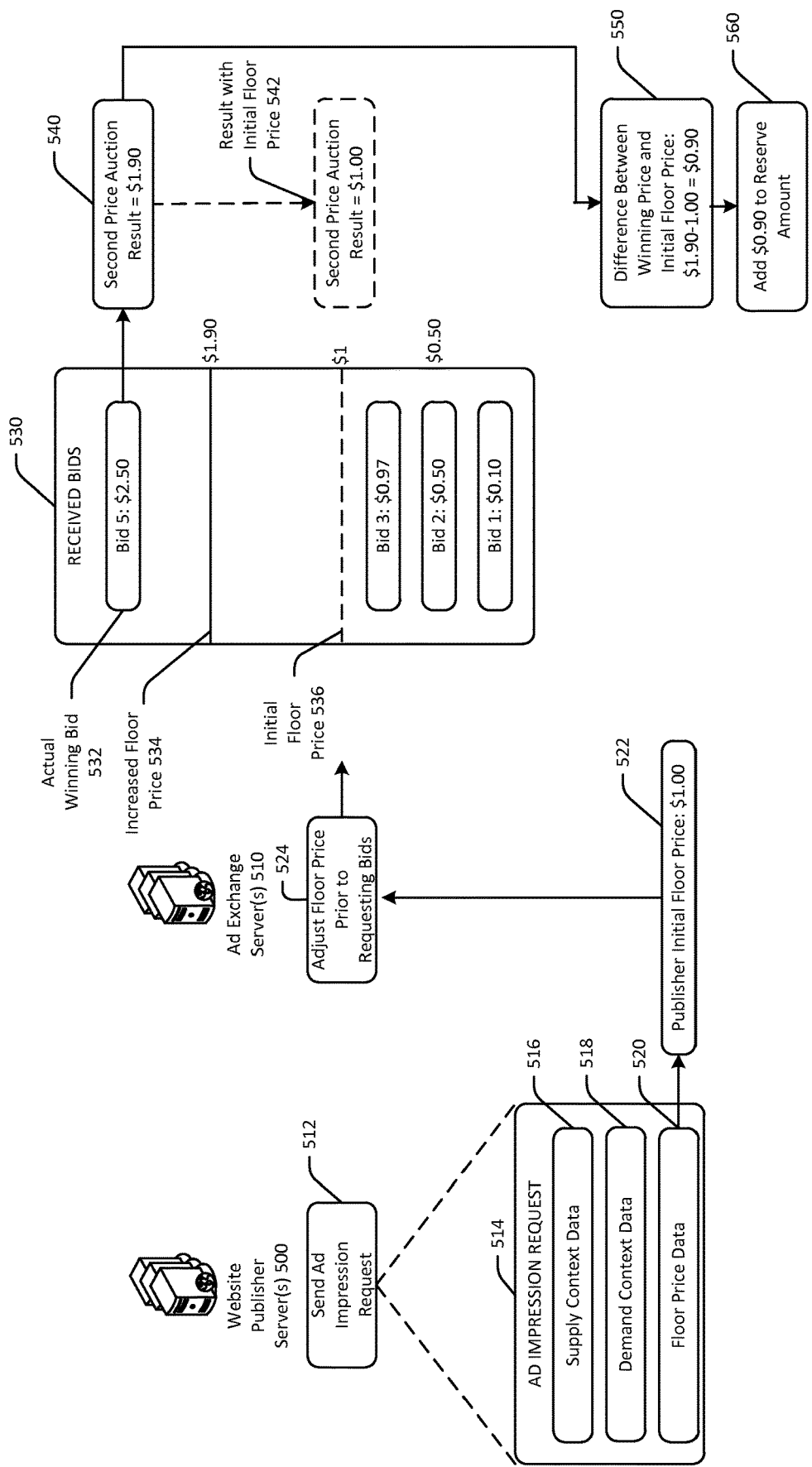
FIG. 5 schematically depicts an example use case of the process flow of FIG. 4 in accordance with one or more embodiments of the disclosure.

Referring now to FIGS. 4 and 5, FIG. 4 illustrates an example process flow 400 for optimizing online advertising bid requests in accordance with one or more embodiments of the disclosure and will be discussed in conjunction with the hybrid dataflow and process flow depicted in FIG. 5. Although certain operations are illustrated as occurring separately in FIGS. 4 and 5 for clarity, some or all of the operations may occur concurrently or partially concurrently. Other embodiments may include additional or fewer, or different, components than those illustrated in FIG. 5.

Referring first to FIG. 4, at block 402 of the process flow 400, an ad exchange server may receive a first ad impression request with first ad slot information for an available ad slot on a publisher website. The first ad impression request may include ad slot information such supply context data, demand context data, floor price data, and other data.

Referring to FIG. 5, an example use case implementing the process flow 400 is illustrated. In the example of FIG. 5, one or more website publisher server(s) 500 may send an ad impression request 512 to one or more ad exchange server(s) 510. The website publisher server 500 and/or the ad exchange server 510 may be the same or different than the respective website publisher server and ad exchange server of FIGS. 1 and 3. The website publisher server 500 may be in communication with a user device and may serve digital content for presentation on a display of the user device. The website publisher server 500 may receive a request for content from the user device and may determine that an ad slot is available for presentation of an ad impression to the user viewing digital content on the user device. The website publisher server 500 may send an ad impression request 514 to the ad exchange server 510. The ad impression request 514 may include or be associated with supply context information 516, such as geolocation data, URL data, page data, content data, time of day data, IP address, and the like, demand content information 518, such as price history, recent actions, seasonality, and the like, and/or floor price data 520, which may indicate a floor price for the available ad slot. The floor price may be a minimum price or bid amount that will be accepted for the ad slot, such that a maximum bid under the floor price will result in no ad impression being served. In the example of FIG. 5, the floor price data 520 may indicate that an initial publisher floor price 522, which may be $1.00. The initial floor price may be set by the publisher and may be communicated as part of the ad impression request, or may be a contractually agreed upon price that may otherwise be accessible to or known by the ad exchange server 510. In some embodiments, the ad impression request 514 may optionally include user profile information, such as demographic information, user interests/segmentation information, user intent information, and the like.

At block 404 of the process flow 400, computer-executable instructions of one or more module(s) stored on a memory of an ad exchange server may be executed to calculate a first predicted winning bid amount based at least in part on the first ad slot information. For example, the first predicted winning bid amount may be determined based at least in part on the supply context information, which may include website context information, geolocation information, etc., the demand context information, user profile information, and the like. In some embodiments, the ad exchange server may determine a time of day at a respective geographic location to facilitate calculating a predicted winning bid amount. For example, a time of day of 4:00 am may result in less demand for the available ad slot than a time of day of 7:00 pm. As a result, the ad exchange server may determine a relative time of data based at least in part on geolocation information. The ad exchange server may consider a user activity history, such as a search history and/or a purchase history, as well as user demographic information in calculating a predicted winning bid amount. For example, a relatively more popular target demographic, such as 18-35 year olds, may be relatively more valuable, in some instances, than a 75+ year old demographic. Likewise, user intent information, which may be determined based at least in part on a search history or a purchase history, may be used to determine a predicted winning bid amount because of the increased interest particular advertisers may have in that user. To determine a predicted winning bid amount, the ad exchange server may further consider a relative quality of the ad slot, information relating to metrics or historical data associated with advertisements that have previously been served at the ad slot (e.g., click-through rate, number of clicks, number of impressions, number of page views, number of associated searches, etc.), historical bids for the ad slot over a predetermined historical period, and other considerations.

At block 406 of the process flow 400, computer-executable instructions of one or more module(s) stored on a memory of an ad exchange server may be executed to determine that the first predicted winning bid is greater than a floor price associated with the first ad impression request.

In FIG. 5, the ad exchange server 510 may receive the ad impression request from the website publisher server 500. The ad exchange server 510 may identify or determine the initial publisher floor price 522 and may determine a predicted winning bid amount of $2.00 based at least in part on the ad impression request information, as well as additional information determined by the ad exchange server 510. The ad exchange server 510 may compare the calculated predicted winning bid amount of $2.00 to the initial publisher floor price of $1.00 to determine that the predicted winning bid amount is greater than the initial publisher floor price.

At block 408 of the process flow 400, computer-executable instructions of one or more module(s) stored on a memory of an ad exchange server may be executed to reduce the first predicted winning bid amount by a first amount to generate a second predicted winning bid amount.

In FIG. 5, the ad exchange server 510 may determine that although the predicted winning bid amount is $2.00, the ad exchange server 510 may reduce the predicted winning bid amount by a fixed value, by a percentage, by a percentage of a difference between the predicted winning bid amount and the initial floor price, or by any other suitable value, to provide a cushion or safety factor in the event that the predicted winning bid amount was too high. As a result, it may be less likely that the ad slot is unsold because the predicted winning bid amount was too high.

At block 410 of the process flow 400, computer-executable instructions of one or more module(s) stored on a memory of an ad exchange server may be executed to increase the floor price from an initial value to match the second predicted winning bid amount.

In FIG. 5, the ad exchange server 510 may adjust the floor price prior to requesting bids at block 524. For example, the ad exchange server 510 may increase the floor price from the initial value of $1.00 to the modified (adjusted for safety) predicted winning bid amount of $1.90. In some embodiments, the floor price may be increased to match the predicted winning bid amount.

At block 412 of the process flow 400, computer-executable instructions of one or more module(s) stored on a memory of an ad exchange server may be executed to generate a first bid request comprising the first ad slot information and the floor price. In FIG. 5, the ad exchange server 510 may generate a bid request with the ad impression request information and the adjusted floor price of $1.90.

At block 414 of the process flow 400, computer-executable instructions of one or more module(s) stored on a memory of an ad exchange server may be optionally executed to determine, based at least in part on the first ad slot information, a set of one or more advertising campaigns that are eligible to bid on the available ad slot. In FIG. 5, for example, the ad exchange server 510 may determine advertisers that are eligible to bid on the available ad slot. In some instances, the ad exchange server 510 may determine whether any potential advertisers are blacklisted from bidding on the ad slot, such as competitors of the publisher, or other blacklisted entities, before sending bid requests, thereby reducing the amount of bid requests that may be received by the ad exchange server 510.

At block 416 of the process flow 400, computer-executable instructions of one or more module(s) stored on a memory of an ad exchange server may be executed to send the first bid request to one or more ad servers, such as the ad servers associated with respective advertising campaigns of the set of one or more advertising campaigns in instances where block 414? is performed.

In FIG. 5, the ad exchange server 510 may send the bid request with the adjusted floor price to one or more ad servers. The ad servers may receive the bid request and may submit a bid to the ad exchange server 510. The ad exchange server 510 may receive a number of bids 530. A first bid may be for $0.10, a second bid may be for $0.50, a third bid may be for $0.97, and a fourth bid may be for $2.50 in the illustrated example.

Upon receiving the bids 530, the ad exchange server 510 may determine a high bidder, and may determine whether the high bidder satisfied the floor price requirement. In FIG. 5, the ad exchange server 510 may determine that the fourth bid of $2.50 is the high bidder, and may determine that the bid amount of $2.50 satisfies an increased floor price 534 of $1.90.

The ad exchange server 510 may perform a second price auction to determine a final sale price for the ad slot based at least in part on the received bids and the floor price. In the illustrated example, because the floor price was modified from an initial floor price 536 of $1.00 to the increased floor price 534 of $1.90, the second price auction result 540 may be $1.90, which may be equal to the floor price. In some embodiments, the final price may be one increment higher than the floor price, such as $1.91. In contrast, with the initial floor price 536 of $1.00, the same high bid of $2.50 would have resulted in a second price auction result 542 of $1.00. The winning bidder may therefore have paid only $1.00 for the ad slot with the initial floor price, but as a result of the increased floor price, the winning bidder must pay $1.90 for the ad slot.

Upon facilitating the auction process, the ad exchange server 510 may determine a difference between the winning price of $1.90 and the initial floor price of $1.00 at block 550. The difference in this example is $0.90. The ad exchange server 510 may store the difference value of $0.90 to a reserve amount at block 560, indicating an increase in sale price due to a floor price adjustment by the ad exchange server 510.

Figure 6:
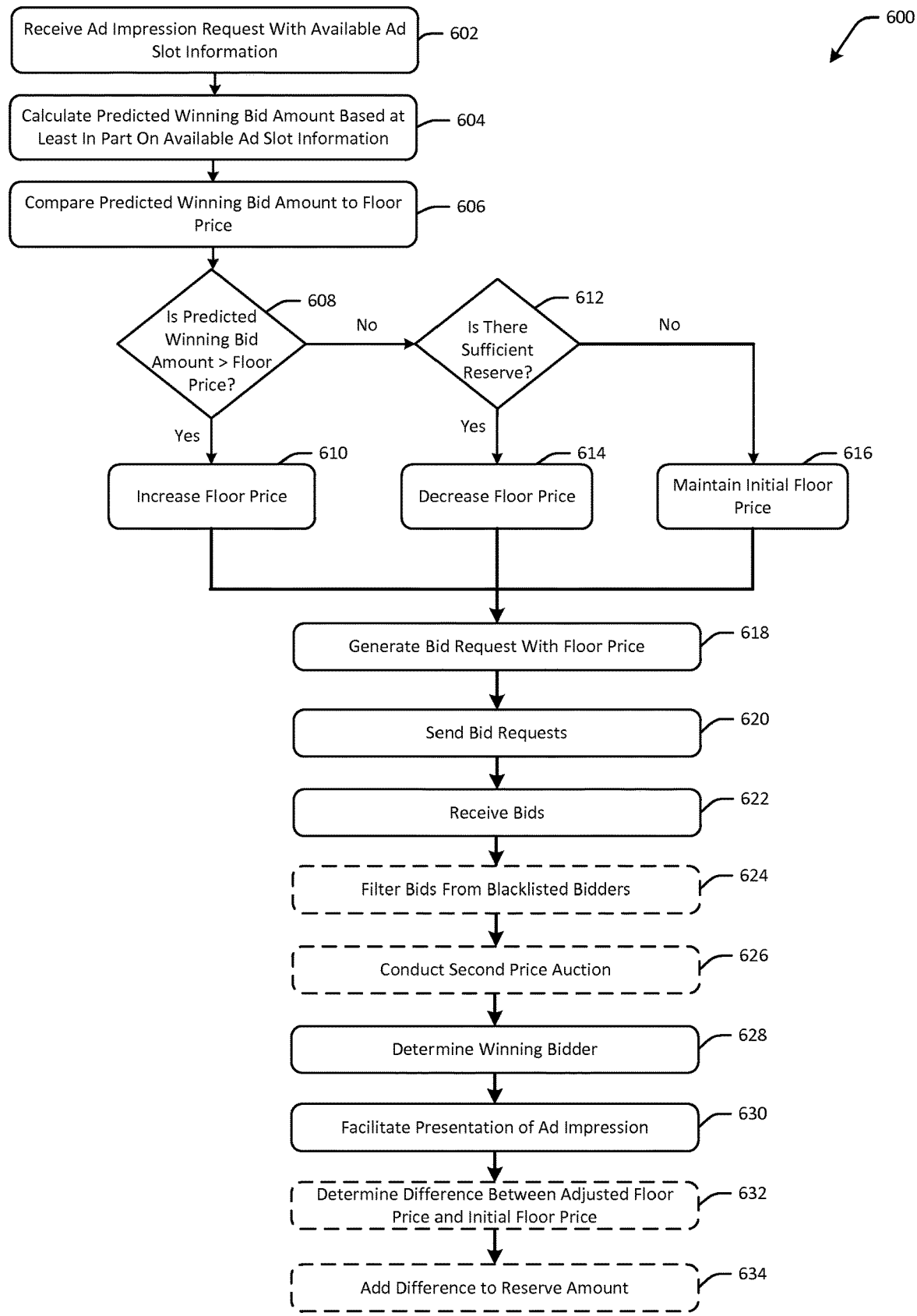
FIG. 6 schematically illustrates an example process flow in accordance with one or more embodiments of the disclosure.
Figure 7:
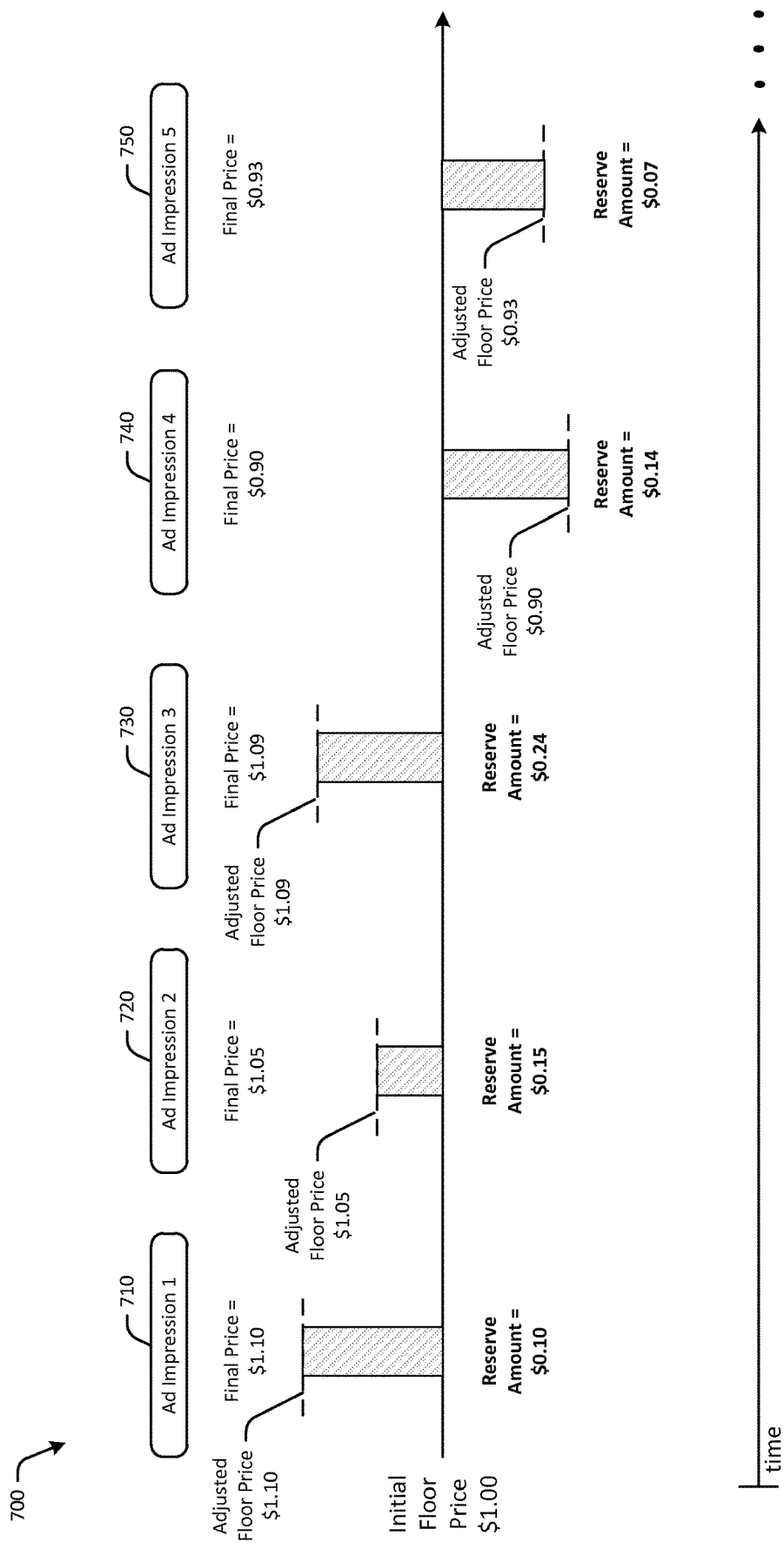
FIG. 7 schematically depicts an example use case of the process flow of FIG. 6 in accordance with one or more embodiments of the disclosure.

Referring now to FIGS. 6 and 7, FIG. 6 illustrates an example process flow 600 for optimizing online advertising bid requests in accordance with one or more embodiments of the disclosure and will be discussed in conjunction with the hybrid dataflow and process flow depicted in FIG. 7. Although certain operations are illustrated as occurring separately in FIGS. 6 and 7 for clarity, some or all of the operations may occur concurrently or partially concurrently. Other embodiments may include additional or fewer, or different, operations or components than those illustrated in FIGS. 6 and 7.

Referring first to FIG. 6, at block 602 of the process flow 600, an ad exchange server may receive an ad impression request with available ad slot information. The available ad slot information may include information such as a publisher identifier, a referring URL address, a user profile identifier, ad dimensions, and the like.

At block 604 of the process flow 600, computer-executable instructions of one or more module(s) stored on a memory of an ad exchange server may be executed to calculate a predicted winning bid amount based at least in part on the available ad slot information. In some instances, the ad exchange server may determine additional information, for example via historical data, real-time information requests, and/or third party external source information requests to enhance the available ad slot information, and may use the additional information in calculating a predicted winning bid amount.

At block 606, computer-executable instructions of one or more module(s) stored on a memory of an ad exchange server may be executed to compare the predicted winning bid amount to a floor price associated with the ad impression request.

At determination block 608, a determination may be made, for example by the ad exchange server, as to whether the predicted winning bid amount is greater than the floor price. If it is determined that the predicted winning bid amount is greater than the floor price, the process flow 600 may proceed to block 610, at which the floor price associated with the ad impression request is increased. For example, the floor price may be increased to the predicted winning bid amount, or to a value in between the initial floor price and the predicted winning bid amount.

If it is determined that the predicted winning bid amount is not greater than the floor price at determination block 608, the process flow 600 may proceed to determination block 612, at which a determination is made as to whether there is sufficient reserve, which may be a determination as to whether there is sufficient reserve to cover a difference between the predicted winning bid amount and the initial floor price. If it is determined that there is sufficient reserve, the process flow 600 may proceed to block 614, at which the initial floor price may be decreased. In some instances the floor price may be decreased to the predicted winning bid amount, while in other instances the floor price may be decreased to an amount between the predicted winning bid amount and the initial floor price. If it is determined that there is not sufficient reserve at determination block 612, the process flow 600 may proceed to block 616, at which the initial floor price associated with the ad impression request is maintained. In some embodiments, the ad exchange server may determine an average floor price for ad impressions associated with the publisher or source of the ad impression request, and may determine whether the average floor price is equal to or greater than the initial floor price. If the average floor price is greater than the initial floor price, the ad exchange server may reduce the floor price for the available ad slot.

At block 618, computer-executable instructions of one or more module(s) stored on a memory of an ad exchange server may be executed to generate a bid request with the appropriate floor price.

At block 620, computer-executable instructions of one or more module(s) stored on a memory of an ad exchange server may be executed to send the bid request to one or more ad servers. At block 622, one or more bids may be received, for example by an ad exchange server.

At block 624, computer-executable instructions of one or more module(s) stored on a memory of an ad exchange server may be optionally executed to filter blacklisted bids or bids from blacklisted bidders. For example, bids from competitors or unsavory advertisers may be filtered out via comparison to blacklisted entities and/or approved bidders or advertisers.

At block 626, computer-executable instructions of one or more module(s) stored on a memory of an ad exchange server may be optionally executed to conduct a second price auction. The second price auction may be used to determine a final sale price for the ad slot and may be based at least in part on a highest bidding amount. In some auction processes for online advertising, a second-price auction may occur after an ad exchange system receives bids in response to a bid request. Second-price auctions may determine a winning bidder's actual payment amount to be an incremental amount or value above the second highest bidders bid. For example, if the highest bid was $2.00, and the second highest bid was $1.00, a second-price auction may be used to determine an actual price for the highest bidder to $1.01, although the highest bidder was willing to pay $2.00 for the ad slot.

At block 628, computer-executable instructions of one or more module(s) stored on a memory of an ad exchange server may be executed to determine a winning bidder. For example, the winning bidder may be the winner of the second price auction and/or the highest bidder. In some instances, determining a winning bidder may include determining whether the winning bid amount meets or exceeds the floor price associated with the bid request.

At block 630, the ad exchange server may facilitate presentation of an ad impression at the ad slot, for example, with an ad designated by the winning bidder. At block 632, computer-executable instructions of one or more module(s) stored on a memory of an ad exchange server may be optionally executed to determine a difference between the final sale price or the adjusted floor price and the initial floor price. At block 634, the ad exchange server may add the difference to a reserve amount. In some embodiments, the ad exchange server may identify a reserve amount associated with a publisher account of the publisher website. The reserve amount may be indicative of a positive difference between a first previous winning bid for a previously sold ad impression and a previous floor price associated with the previously sold ad impression.

Referring to FIG. 7, an example use case 700 implementing the process flow 600 is illustrated. In the example of FIG. 7, ad impressions associated with an initial floor price of $1.00 are illustrated over time. A first ad impression 710 may be first in time and may have the initial floor price of $1.00. An ad exchange server in accordance with one or more embodiments of the disclosure may determine that the floor price should be increased to $1.10, which may result in a sale of the ad slot for $1.10. The ad exchange server may calculate a difference between the increased floor price and initial floor price to be $0.10, and may add $0.10 to a reserve amount for the publisher server or website server.

A second ad impression 720 may also have the initial floor price of $1.00. The ad exchange server may determine that the floor price should be increased to $1.05, which may result in a sale of the ad slot for $1.05. The ad exchange server may calculate a difference between the increased floor price and initial floor price to be $0.05, and may add $0.05 to the reserve amount for the publisher server or website server for a total of $0.15.

A third ad impression 730 may also have the initial floor price of $1.00. The ad exchange server may determine that the floor price should be increased to $1.09, which may result in a sale of the ad slot for $1.09. The ad exchange server may calculate a difference between the increased floor price and initial floor price to be $0.09, and may add $0.09 to the reserve amount for the publisher server or website server for a total of $0.24.

A fourth ad impression 740 may also have the initial floor price of $1.00. The ad exchange server may determine that the floor price should be decreased to $0.90, which may be a difference of $0.10. The ad exchange server may determine that the difference of $0.10 is less than or equal to the reserve amount of $0.24. As a result, the ad exchange server may reduce the floor price to $0.90, which may increase a likelihood of sale of the ad slot. If the ad slot sells, for example at $0.90, the ad exchange server may calculate a difference between the initial floor price and the decreased floor price to be $0.10, and may deduct $0.10 from the reserve amount for the publisher server or website server for a remaining total of $0.14.

A fifth ad impression 750 may also have the initial floor price of $1.00. The ad exchange server may determine that the floor price should be decreased to $0.93, which may be a difference of $0.07. The ad exchange server may determine that the difference of $0.07 is less than or equal to the reserve amount of $0.14. As a result, the ad exchange server may reduce the floor price to $0.93, which may increase a likelihood of sale of the ad slot. If the ad slot sells, for example at $0.93, the ad exchange server may calculate a difference between the initial floor price and the decreased floor price to be $0.07, and may deduct $0.07 from the reserve amount for the publisher server or website server for a remaining total of $0.07. If the reserve amount was insufficient to cover the difference between the predicted sale price and the initial floor price, the ad exchange server may maintain the initial floor price, so as to not drop below an average floor price of $1.00 for the publisher or website. As a result of adjusting the floor price, the publisher sells all ad impressions 1-5, and in this scenario receives total revenue of $5.07. Whereas, with a static $1 floor price, the publisher might have only received $3.00 of revenue and had two unsold slots.

One or more operations of the method, process flows, or use cases of FIGS. 1-7 may have been described above as being performed by a computer device or server, or more specifically, by one or more program modules, applications, or the like executing on a device. It should be appreciated, however, that any of the operations of methods, process flows, or use cases of FIGS. 1-7 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order as desired in various example embodiments of the disclosure, and in some instances may be performed as an ordered combination, such as the ordered combinations illustrated in the drawings. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
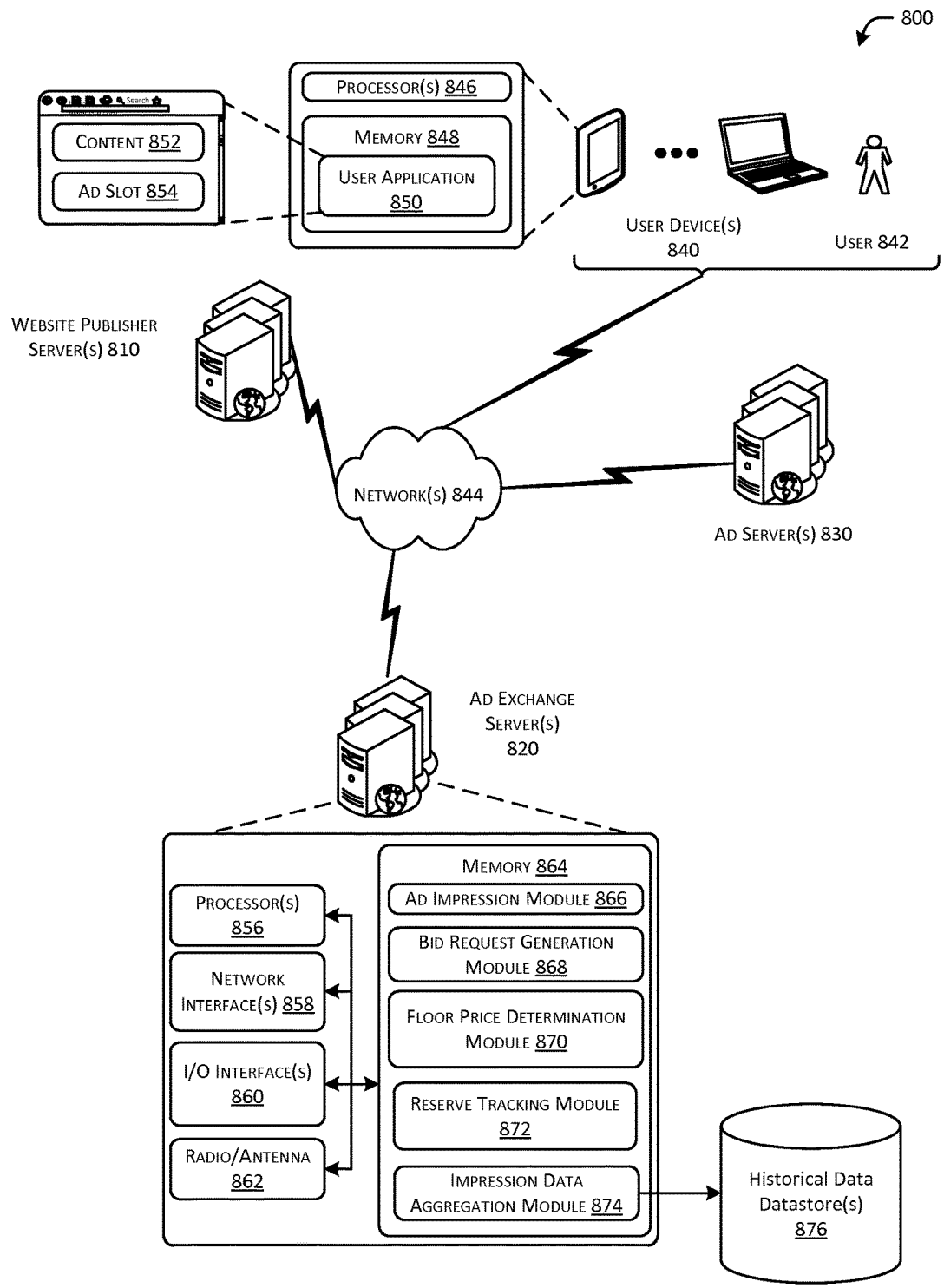
FIG. 8 schematically illustrates an example system architecture in accordance with one or more embodiments of the disclosure.

Referring now to FIG. 8, an example computer network architecture 800 is depicted. FIG. 8 includes an example website publisher server 810, an example ad exchange server 820, an example ad server(s) 830, and an example user device 840 with a user 842. Each component may be connected via one or more network(s) 844.

The network(s) 844 may include, but are not limited to, any one or more different types of suitable communications networks, such as cable networks, the Internet, wireless networks, cellular networks, or other private and/or public networks. Further, the network(s) 844 may include any type of medium over which network traffic may be carried including, but not limited to, coaxial cable, twisted-pair wire, optical fiber, hybrid fiber coaxial (HFC), microwave terrestrial transceivers, a radio frequency communication medium, a satellite communication medium, or any combination thereof.

As illustrated, the user device 840 may include one or more processor(s) 846 and one or more memory devices 848 with a user application 850 stored thereon. The user device 840 may also include various additional components, such as one or more input device(s), I/O interface(s), radio/antennas, network interface(s), and other components. The user device 840 may also include an operating system configured to provide an interface between software and hardware resources of the user device 840, and/or database management systems configured to support functionality of the memory 848. The user device 840 may include system busses that functionally couple various components of the user device 840. In other embodiments, the user device 840 may include additional or fewer components.

The memory 848 may include one or more program modules, applications, or the like, such as the user application 850. One or more user applications 850 may be loaded into the memory 848. The user applications 850 may be any application(s) capable of facilitating the display of or otherwise presenting advertisement impressions to the user 842. The user applications 850 may include, but are not limited to, a web-based browser application, a dedicated software application (e.g., a smart phone application, a tablet application, etc.), a mobile browser application, and so forth. The user application 850 may be configured to render web pages on a respective user device. The web pages may include an advertisement presented in the available advertising slot 854 and other content 852 viewable by the user 842. Any data may be loaded into the memory 848 for use by the processor(s) 846 in executing computer-executable code. The user device 840 may be configured to access, store, and/or retrieve data in or from one or more datastore(s). The user device 840 may also include communications connection(s) that allow the user device 840 to communicate with datastores, other computing devices or servers, user terminals, and/or other devices via the network(s) 844.

The user device 840 may be any suitable user device including, but not limited to, a mobile device such as a smartphone, tablet, e-reader, or the like; a desktop computer; a laptop computer, a game console, a personal media player, a wearable computer device (e.g., eyewear, wristwatches, embedded devices, etc.), and so forth. The user device 840 may be configured to present or serve ad impressions to users 842. The user device 840 may be configured to operate in various operational modes and may be configured to present electronic content and ad impressions.

The ad exchange server(s) 820 may include one or more processor(s) 856, one or more network interface(s) 858, one or more input/output ("I/O") interface(s) 860, one or more radio/antenna(s) 862, and one or more memory devices 864. The ad exchange server(s) 820 may also include various additional components, such as one or more input device(s), configured to interact with the I/O interface 860, that may facilitate operation of the ad exchange server(s) 820. The ad exchange server(s) 820 may also include an operating system configured to provide an interface between software and hardware resources of the ad exchange server(s) 820, and/or database management systems configured to support functionality of the memory 864. The ad exchange server(s) 820 may include system busses that functionally couple various components of the ad exchange server(s) 820. In other embodiments, the ad exchange server(s) 820 may include additional or fewer components.

The memory 864 may include one or more program modules, applications, or the like, such as one or more ad impression module(s) 866, one or more bid request generation module(s) 868, one or more floor price determination module(s) 870, one or more reserve tracking module(s) 872, and/or one or more impression data aggregation module(s) 874. Any of the modules may include one or more submodules. While illustrated as part of the ad exchange server 820, the depicted modules and related functionality may be distributed across various computer systems. The website publisher server 810 or the ad server 830 may also include some of the components illustrated as part of the ad exchange server 820. Any of the modules depicted in FIG. 8 may include computer-executable code, instructions, or the like that may be loaded into the memory 864 for execution by one or more of the processor(s) 856.

The ad exchange server(s) 820 may be configured to access, store, and/or retrieve data in or from one or more datastore(s). For example, in various embodiments, the ad exchange server 820 may be in communication with one or more historical data datastore(s) 876 that may have information related to previously processed ad impressions and related auctions.

The ad exchange server(s) 820 may also include communications connection(s) that allow the ad exchange server(s) 820 to communicate with datastores, other computing devices or servers, user terminals, and/or other devices via the network(s) 844. For example, the ad exchange server(s) 820 may utilize the radio/antenna 862 to communicate with the ad server 830, the website publisher server 810, and/or the user device(s) 840.

Referring now to the functionality of the modules illustrated in FIG. 8, the ad exchange server 820 may include the ad impression module(s) 866, the bid request generation module(s) 868, the floor price determination module(s) 870, the reserve tracking module(s) 872, and/or the impression data aggregation module(s) 874.

The ad impression module(s) 866 may include computer-executable instructions that upon execution by the processor(s) 856 configures the processor(s) 856 to receive ad impression requests and to determine ad slot information associated with the ad impression request.

The bid request generation module(s) 868 may include computer-executable instructions, code, or the like, that, responsive to execution by the processor(s) 856, may cause the ad exchange server(s) 820 to generate and send bid requests for available ad slots. The bid request generation module(s) 868 may be further configured to identify blacklisted and/or approved bidders and to receive and evaluate received bids.

The floor price determination module(s) 870 may include computer-executable instructions, code, or the like, that, responsive to execution by the processor(s) 856, may cause the ad exchange server(s) 820 to determine whether to modify a floor price and if so, how to modify the floor price. The floor price determination module(s) 870 may be further configured to calculate predicted winning bid amounts.

The reserve tracking module(s) 872 may include computer-executable instructions, code, or the like, that, responsive to execution by the processor(s) 856, may cause the ad exchange server(s) 820 to track a total reserve amount for a particular publisher, website, or other entity over time.

The impression data aggregation module(s) 874 may include computer-executable instructions, code, or the like, that, responsive to execution by the processor(s) 856, may cause the ad exchange server(s) 820 to access and/or determine additional information to enhance data associated with an ad impression request or related bid request.

The processor(s) 846, 856 of each component in the system 840 may be implemented as appropriate in hardware, software, firmware, or combinations thereof. Software or firmware implementations of the processor(s) 846, 856 may include computer-executable or machine-executable instructions written in any suitable programming language to perform the various functions described. Similarly, hardware implementations of the processor(s) 846, 856 may be configured to execute computer-executable or machine-executable instructions to perform the various functions described.

The processor(s) 846, 856 of each component in the system 840 may be configured to access the respective memory and execute computer-executable instructions loaded therein. For example, the processor(s) 846, 856 of each component in the system 840 may be configured to execute computer-executable instructions of the various program modules to cause or facilitate various operations to be performed in accordance with one or more embodiments of the disclosure. The processor(s) 846, 856 may include any suitable processing unit capable of accepting data as input, processing the input data in accordance with stored computer-executable instructions, and generating output data. The processor(s) 846, 856 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 846, 856 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 846, 856 may be capable of supporting any of a variety of instruction sets.

The respective network interface(s) 858 of devices in the system 820 may be configured to allow the respective devices to communicate with content providers and other entities over networks (e.g., network(s) 844), such as local-area networks (LANs), wide-area networks (WANs), the Internet, wireless networks, wireless wide-area networks (WWANs), cable television networks, telephone networks, cellular communications networks, combinations of the foregoing, and/or the like. Further, such networks may have any suitable communication range associated therewith and may include, for example, metropolitan area networks (MANs) or personal area networks (PANs). In addition, such networks may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The respective input/output (I/O) interface(s) 860 of components of the system 820 may facilitate the receipt of input information by the respective devices from one or more I/O devices as well as the output of information from the respective devices to the one or more I/O devices. The I/O devices may include, for example, one or more user interface devices that facilitate interaction between a user and the respective devices including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The radio/antenna(s) 862 may include any suitable type of antenna(s) depending, for example, on the communications protocols used to transmit or receive signals via the radio/antenna(s) 862. Non-limiting examples of suitable antennas may include directional antennas, non-directional antennas, dipole antennas, folded dipole antennas, patch antennas, multiple-input multiple-output (MIMO) antennas, or the like. The radio/antenna(s) 862 may be communicatively coupled to one or more transceiver components to which or from which signals may be transmitted or received. The radio/antenna(s) 862 may include, without limitation, a cellular antenna for transmitting or receiving signals to/from a cellular network infrastructure, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), 5G standards, direct satellite communications, or the like. Other example antennas can include a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth.

The radio/antenna(s) 862 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the radio/antenna(s) 862 may be configured to transmit or receive radio frequency signals within any suitable frequency range forming part of the unlicensed portion of the radio spectrum.

Each respective memory 848, 864 may store program instructions that are loadable and executable on processor(s), as well as data generated during the execution of these programs. The respective memory 848, 864 of the devices of the system may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory. The memory 848, 864 may include removable and/or non-removable media which may be implemented in any method or technology for storage of information, such as computer-readable instructions, data structures, program modules, or other data. The components of the system 840 may also include additional removable storage and/or non-removable storage (not shown) including, but not limited to, magnetic storage, optical disks, and/or tape storage. The disk drives and their associated computer-readable media may provide non-volatile storage of computer-readable instructions, data structures, program modules, and other data. In some implementations, the memory 848, 864 may include multiple different types of memory, such as static random access memory (SRAM), dynamic random access memory (DRAM), and/or ROM. Computer-readable storage media may include volatile and/or non-volatile, removable and/or non-removable media implemented according to any method or technology for storage of information such as computer-readable instructions, data structures, program modules, and/or other data.

Additional types of computer storage media that may be present in the user device 840 and/or the ad exchange server 820 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the desired information and which can be accessed by the aforementioned devices. Combinations of any of the above are be included within the scope of computer-readable media.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, although specific examples of bid amounts, bid data, ad metrics, delivery constraints, optimization criteria, and/or quality parameters have been presented, it should be appreciated that numerous other examples are within the scope of this disclosure.

It should further be appreciated that components of the systems described herein may include alternate and/or additional hardware, software, or firmware components beyond those described or depicted without departing from the scope of the disclosure. More particularly, it should be appreciated that software, firmware, or hardware components depicted as forming part of the depicted systems are merely illustrative and that some components may not be present or additional components may be provided in various embodiments. While various illustrative program modules have been depicted and described as software or data stored locally, it should be appreciated that functionality described as being supported by the program modules may be enabled by any combination of hardware, software, and/or firmware and may be stored remotely. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

What is claimed is:

1. A method comprising:
  receiving, by a server comprising one or more computer processors, a first ad impression request indicative of a request for an ad to fill an ad slot on a publisher website or mobile application from an ad exchange server, the first ad impression request comprising a referral website URL for the publisher website or mobile application, wherein the first ad impression request does not comprise ad slot dimension information;
  extracting first publisher website or mobile application information from the publisher website or mobile application;
  associating the first publisher website or mobile application information with the first ad impression request;
  comparing the referral website URL to a set of one or more historical ad impression requests;
  determining a second ad impression request from the set of one or more historical ad impression requests that comprises at least a portion of the referral website URL, the second ad impression request indicative of a historical request for a historical ad to fill the ad slot;
  identifying second publisher website or mobile application information associated with the second ad impression request, the second publisher website or mobile application information comprising the ad slot dimension information;
  associating the second publisher website or mobile application information with the first ad impression request;
  generating a bid request associated with the first ad impression request, the bid request comprising at least the portion of the referral website URL, and the ad slot dimension information associated with the second ad impression request;
  sending the bid request to one or more ad servers; and
  receiving, from the one or more ad servers, reduced number of bid submissions in response to the bid request such that an amount of computing power of the server to process the bid submissions and determine a winning bid is reduced.

2. The method of claim 1, wherein receiving the reduced number of bid submissions comprises:
  receiving, by the server, a bid from the one or more ad servers in response to the bid request, the bid comprising a bid amount for the ad slot;
  determining that the bid is the winning bid;
  sending a winning notification to the one or more ad servers;
  receiving ad impression information comprising a digital advertisement; and
  sending the ad impression information for presentation of the digital advertisement in the ad slot at the publisher website or mobile application.

3. The method of claim 1, further comprising:
  sending, by the server, an information request comprising at least the portion of the referral website URL to a third party server, the information request indicative of a request for a publisher identifier associated with the referral website URL;
  receiving the publisher identifier; and
  associating the publisher identifier with the first ad impression request, wherein the bid request further comprises the publisher identifier.

4. The method of claim 3, wherein the information request further comprises a request for mobile application information, and the method further comprises:
  receiving the mobile application information comprising a mobile application name, a mobile application version, a set of one or more mobile application features, a mobile application user rating, a mobile device operating system, or a browser identifier; and
  associating the mobile application information with the first ad impression request.

5. The method of claim 1, wherein the first publisher website or mobile application information and the second publisher website or mobile application information further comprise a publisher identifier, website or mobile application context information, user information, mobile device information, or mobile application information.

6. The method of claim 1, further comprising storing the first ad impression request in the set of one or more historical ad impression requests.

7. The method of claim 1, wherein extracting the first publisher website or mobile application information from the publisher website or mobile application comprises receiving the first publisher website or mobile application information from a JavaScript engine executed on a browser operating on a user device of a user to which an ad impression is to be presented.

8. The method of claim 1, further comprising determining that the first ad impression request is missing a user identifier.

9. The method of claim 1, further comprising:
  extracting, by the server, the referral website URL from the first ad impression request to generate extracted information;

sending the extracted information to a remote server comprising cached historical ad impression requests; and receiving the set of one or more historical ad impression requests.

10. The method of claim 1, further comprising:

determining, by the server and based at least in part on metadata associated with the publisher website or mobile application, a webpage sentiment category; and associating the webpage sentiment category with the first ad impression request.

11. The method of claim 1, further comprising:

determining, by the server and based at least in part on the first ad impression request, a location identifier indicative of a location at the publisher website or mobile application at which the ad slot is positioned; and associating the location identifier with the first ad impression request.

12. The method of claim 1, further comprising:

identifying consumer information comprising cookies, the consumer information indicative of a consumer to which the ad slot is to be presented; and associating the consumer information with the first ad impression request.

13. A method comprising:

receiving, by a server comprising one or more computer processors, a first ad impression request for an ad slot on a publisher website or mobile application from an ad exchange server, the first ad impression request comprising at least a portion of a referral website URL for the publisher website or mobile application;

extracting first publisher website or mobile application information from the publisher website or mobile application, wherein the first publisher website or mobile application information does not comprise a publisher identifier associated with the referral website URL;

associating the first publisher website or mobile application information with the first ad impression request;

sending an information request comprising at least the portion of the referral website URL to a third party server, the information request indicative of a request for a publisher identifier associated with the referral website URL;

receiving the publisher identifier;

associating the publisher identifier with the first ad impression request;

generating a bid request associated with the first ad impression request, the bid request comprising at least the portion of the referral website URL and the publisher identifier;

sending the bid request to one or more ad servers; and receiving, from one or more ad servers, reduced number of bid submissions in response to the bid request such that an amount of computing power to process the bid submissions and determine a winning bid is reduced.

14. The method of claim 13, wherein the first ad impression request does not comprise ad slot dimension information, the method further comprising:

comparing at least the portion of the referral website URL to a set of one or more historical ad impression requests;

determining a second ad impression request from the set of one or more historical ad impression requests that comprises at least the portion of the referral website URL;

identifying second publisher website or mobile application information associated with the second ad impression request, the second publisher website or mobile application information comprising ad slot dimension information; and associating the second publisher website or mobile application information with the first ad impression request, wherein the bid request further comprises the ad slot dimension information associated with the second ad impression request.

15. The method of claim 13, wherein receiving the reduced number of bid submissions comprises:

receiving, by the server, a bid from the one or more ad servers in response to the bid request, the bid comprising a bid amount for the ad slot;

determining that the bid is the winning bid;

sending a winning notification to the one or more ad servers;

receiving ad impression information comprising a digital advertisement; and sending the ad impression information for presentation of the digital advertisement in the ad slot at the publisher website or mobile application.

16. The method of claim 13, further comprising determining that the first ad impression request is missing website context information or publisher identifier.

17. The method of claim 13, wherein extracting the first publisher website or mobile application information from the publisher website or mobile application comprises receiving the first publisher website or mobile application information from a JavaScript engine executed on a browser operating on a user device of a user to which an ad impression is to be presented.

18. A computer system comprising:

at least one memory that stores computer-executable instructions; and at least one processor configured to access the at least one memory and execute the computer-executable instructions to:

receive a first ad impression request indicative of a request for an ad to fill an ad slot on a publisher website or mobile application from an ad exchange server, the first ad impression request comprising at least a portion of a referral website URL for the publisher website or mobile application, wherein the first ad impression request does not comprise ad slot dimension information;

extract first publisher website or mobile application information from the publisher website or mobile application;

associate the first publisher website or mobile application information with the first ad impression request;

compare the referral website URL to a set of one or more historical ad impression requests;

determine a second ad impression request from the set of one or more historical ad impression requests that comprises at least the portion of the referral website URL, the second ad impression request indicative of a historical request for a had to fill the ad slot;

identify second publisher website or mobile application information associated with the second ad impression request, the second publisher website or mobile application information comprising the ad slot dimension information;

associate the second publisher website or mobile application information with the first ad impression request;

generate a bid request associated with the first ad impression request, the bid request comprising at least the portion of the referral website URL, and the ad slot dimension information associated with the second ad impression request;

send the bid request to one or more ad servers; and receive, from one or more ad servers, reduced number of bid submissions in response to the bid request such that an amount of computing power to process the bid submissions and determine a winning bid is reduced.

19. The computer system of claim 18, wherein receiving the reduced number of bid submissions comprises:

receiving a bid from the one or more ad servers in response to the bid request, the bid comprising a bid amount for the ad slot;

determining that the bid is the winning bid;

sending a winning notification to the one or more ad servers;

receiving ad impression information comprising a digital advertisement; and sending the ad impression information for presentation of the digital advertisement in the ad slot at the publisher website or mobile application.

20. The computer system of claim 18, wherein the at least one processor is further configured to execute the computer-executable instructions to:

send an information request comprising at least the portion of the referral website URL to a third party server, the information request indicative of a request for a publisher identifier associated with the referral website URL;

receive the publisher identifier; and associate the publisher identifier with the first ad impression request, wherein the bid request further comprises the publisher identifier.

21. The computer system of claim 18, wherein the first publisher website or mobile application information and the second publisher website or mobile application information further comprising a publisher identifier, website context information, user information, mobile device information, or mobile application information.

22. The computer system of claim 18, wherein the at least one processor is configured to extract the first publisher website or mobile application information from the publisher website or mobile application by executing the computer-executable instructions to:

receive the first publisher website or mobile application information from a JavaScript engine executed on a browser operate on a user device of a user to which an ad impression is to be presented.

23. The computer system of claim 18, wherein the at least one processor is further configured to execute the computer-executable instructions to:

determine that the first ad impression request is missing a user identifier.

* * * * *